May 1, 1928.

E. L. SCHELLENS ET AL 1,668,340

LOCOMOTIVE BOOSTER DEVICE

Filed July 21, 1922

WITNESS
Gustav Genzlinger

INVENTORS
J. S. Coffin Jr
E. L. Schellens
BY
ATTORNEYS

May 1, 1928.                        1,668,340
E. L. SCHELLENS ET AL
LOCOMOTIVE BOOSTER DEVICE
Filed July 21, 1922        3 Sheets-Sheet 2

May 1, 1928. 1,668,340

E. L. SCHELLENS ET AL
LOCOMOTIVE BOOSTER DEVICE
Filed July 21, 1922  3 Sheets-Sheet 3

Patented May 1, 1928.

1,668,340

UNITED STATES PATENT OFFICE.

EUGENE L. SCHELLENS, OF POINTE CLAIRE, QUEBEC, CANADA, AND JOEL S. COFFIN, JR., OF LISBON, NEW HAMPSHIRE, ASSIGNORS, BY DIRECT AND MESNE ASSIGNMENTS, TO C-S ENGINEERING CO., A CORPORATION OF DELAWARE.

LOCOMOTIVE BOOSTER DEVICE.

Application filed July 21, 1922. Serial No. 576,616.

This invention relates to locomotive booster devices and it is especially useful in trailer truck applications.

One of the primary objects of our invention is the provision of a lighter and simpler construction which not only reduces the cost but enables us to apply boosters to such engines in which, heretofore, it was not possible to make a booster application, in addition to which the throwing of excessive weight on the drivers is avoided, a greater ash pan clearance is provided, and the idle trailer weight is cut down.

Another object of the invention is to make possible the use of an open body construction in the truck thus affording a greater space for the booster motor and greater clearances for inspection and repair. This also makes the removal and interchange of boosters easier and reduces the heating of trailer journals due to disalignment.

Still another object of our invention is to produce a standard and interchangeable arrangement in which the truck may be used with or without booster and in which the booster and truck can be interchanged either separately or as a single unit, thus greatly reducing the first and the ultimate costs.

Another object of our invention is to provide an improved construction which greatly facilitates the dropping of the trailers at outlying points and in which maintenance and liability of failure at points of excessive vibration are reduced to a minimum.

Still another object of the invention is to maintain the proper relationship between the booster motor and trailer bearings.

Among other objects of our invention is the provision of a construction which is not affected by lateral wear up to wide limits and in which there is practically no pedestal jaw wear.

The foregoing, together with such other objects as may hereinafter appear, or are incident to our invention, we obtain by means of a construction which we have illustrated in preferred form in the accompanying drawings, wherein.

Figure 1:
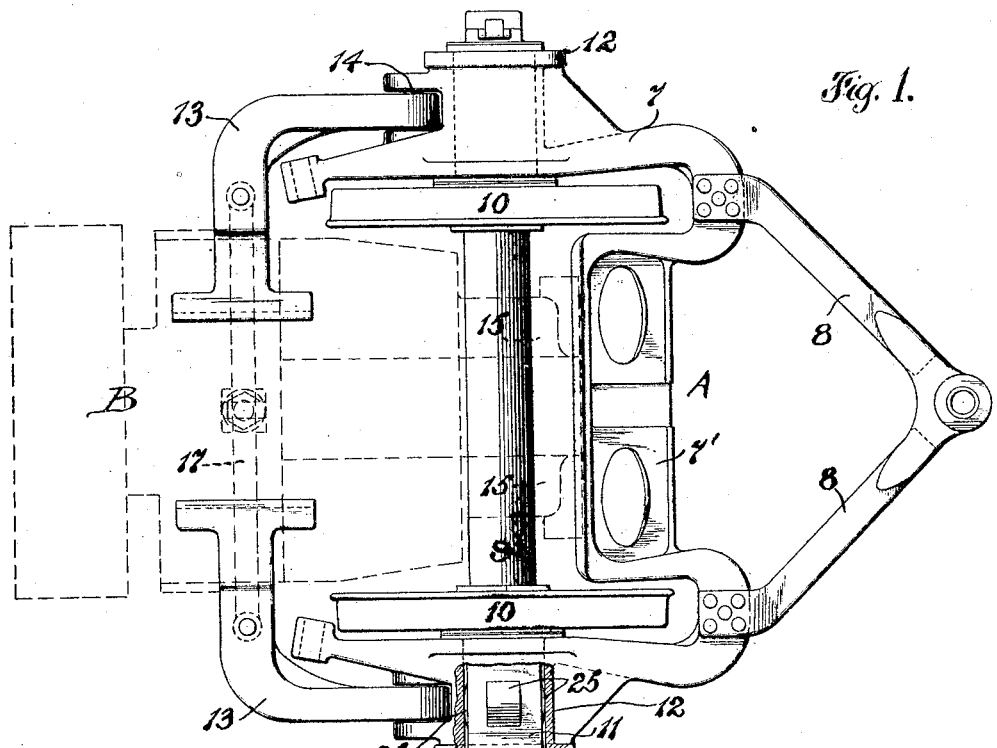
Fig. 1 is a plan view of a trailer truck and booster embodying our invention, the booster being shown in dotted line.
Figure 2:
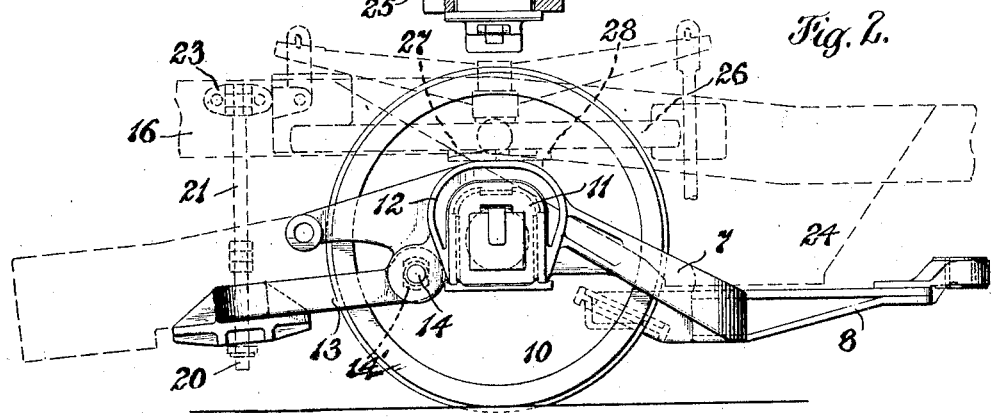
Fig. 2 is a side elevation of Fig. 1 with certain portions of the locomotive structure shown in dotted line.
Figure 3:
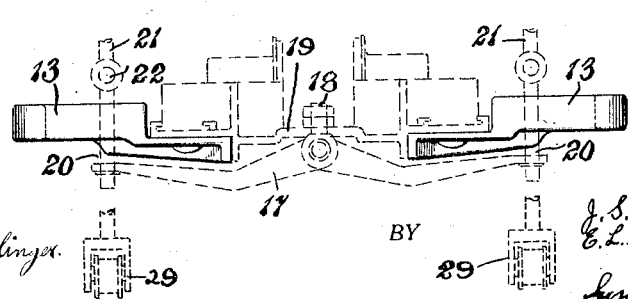
Fig. 3 is an end elevation showing the means for maintaining the booster in alignment with the axle in full lines and the means for suspending the booster motor from the locomotive structure in dotted lines.

Referring now to the construction of Figs. 1, 2 and 3, it will be seen that the device in general comprises the truck, indicated as a whole by the reference letter A, and the booster motor, indicated by the reference letter B. The truck comprises the frame 7, open in the rear; the radius bars 8 for pivotal connection to the locomotive structure; the axle 9 which has wheels 10 and which is journaled in the boxes 11 fitting within the saddles 12, such saddles being preferably formed integrally with the frame 7; and the brackets 13 which serve to maintain the booster motor in alignment with the axle 9 with which it has driving connection, as will further appear. The brackets 13 are articulated with the open frame 7 as by means of the pivotal connection 14, illustrated in Figs. 1 and 2.

As is well understood in this art, the booster motor B has its forward end supported on the axle 9, by suitable bearings, driving engagement being established by gears (not shown). The bearings are diagrammatically indicated at 15 in Fig. 1. Since the truck, and therefore, the booster motor, must have freedom for lateral swinging motion relative to the locomotive structure, it has heretofore been the practice to provide a very heavy and cumbersome form of truck frame, closed in the rear, as well as in the front, the booster motor being supported on the rearward portion of the truck frame. A further reason for employing the heavy closed type of truck frame referred to has been that without such a construction, disalignment between the axle and the driving boxes or journal boxes, would ordinarily take place with the result that there would be uneven wear on the bearings and the journals would run hot. This form of truck, however, is open to some objections, such for example, as excessive wheel and idle load, minimum space available for the booster, etc.

We overcome the difficulty mentioned with respect to the axle and booster motor bearings by means of the brackets 13, for while these brackets are free to rock up and down on a transverse horizontal axis, nevertheless they afford lateral support for the booster motor, maintaining it in proper alignment with the axle and relieving the bearings 15 of any load which might otherwise be imposed as the trailer truck swings relative to the locomotive during curving. With this form of construction, the booster motor is supported from the side frames 16 of the locomotive by a suspension mechanism which will permit the booster to move with the truck laterally with respect to the locomotive structure.

This suspension mechanism consists of the beam 17 having a pivot pin or eyebolt 18 at its center; the booster bed plate 19 resting on the head or eye portion of said pin; the rods 20; and the links 21; the links 21 are pivoted to the rods 20, as indicated at 22, and they are also pivoted to the brackets 23 attached to the side frames. The rods 20 pass through holes in the brackets 13 and are thus guided and maintain the beam 17 in fixed relation to the centre line of the booster.

It will be seen that this suspension permits the truck and booster to move freely during curving and this without causing any binding of the booster motor bearings on the axle. If one of the suspension links were to break, the remaining one would act as a safety member holding up the booster motor. As relative vertical movement takes place between the locomotive structure and the truck, under service conditions, the booster motor rocks slightly up and down, the brackets 13 rocking on the pivotal connections 14. It will be noted that the hole 14' for the pivot pin is in the form of a slot which permits the booster to rock on the axle without binding and at the same time prevents the transmission of vibration to the brackets 13. The arrangement thus meets all working conditions and relieves the brackets of stresses and vibration which otherwise would tend to produce failure of the brackets.

The difficulty mentioned with respect to the boxes or journals and the heating of the same due to disalignment, we overcome by providing a means which will compensate for any bending, springing or distortion of the open truck frame in service. In the embodiment shown, this compensating means takes the form of a self-aligning journal box, to which end the box 11 is provided on the top and on the two sides with a curved insert or plate 25. The top and the jaws of the saddle respectively bear on these curved plates which, in reality, act somewhat in the nature of a ball joint providing, to a certain degree, universal motion. This arrangement permits the boxes to always remain in alignment with the axle, notwithstanding any springing of the open frame. The arrangement is thus one in which proper relationship of the bearings is maintained while at the same time there is no pedestal jaw wear and the device is not affected by lateral wear up to very wide limits.

As pointed out, the whole arrangement is one which tends to greatly reduce the size and weight of parts and provides a maximum space for the booster, not only making boosters applicable where heretofore they have not been applicable, but also making it possible to increase the size of the booster motors in certain types of locomotives. It will also be seen that ease of assemblage and of taking down for purposes of repair or inspection is greatly facilitated.

It will also be seen that the truck may be used with or without the booster and that the booster and truck can be interchanged separately or as a unit. The parts are thus in effect standard and are capable of a very wide range of application. In this connection it will be appreciated that the truck can be applied by providing a suitable form of slip joint intermediate the saddles and the spring yokes, the type of joint depending upon the particular class of locomotive. In Fig. 2 we have indicated in dotted line a standard form of spring yoke 26, and in this embodiment of our invention we have interposed between the saddle and the spring yoke a pair of slip plates 27 and 28 which permit of the amount of radial movement of the truck that is required in service.

In the repair shop, the booster motor may be readily handled by dropping it onto castors 29 indicated in Fig. 3.

It will be noted that the frame 7 is downwardly inclined and that its middle front portion 7' is set well back toward the axle 9. By this arrangement we provide a maximum clearance for the ash pan 24, shown in Fig. 2.

Figure 4:
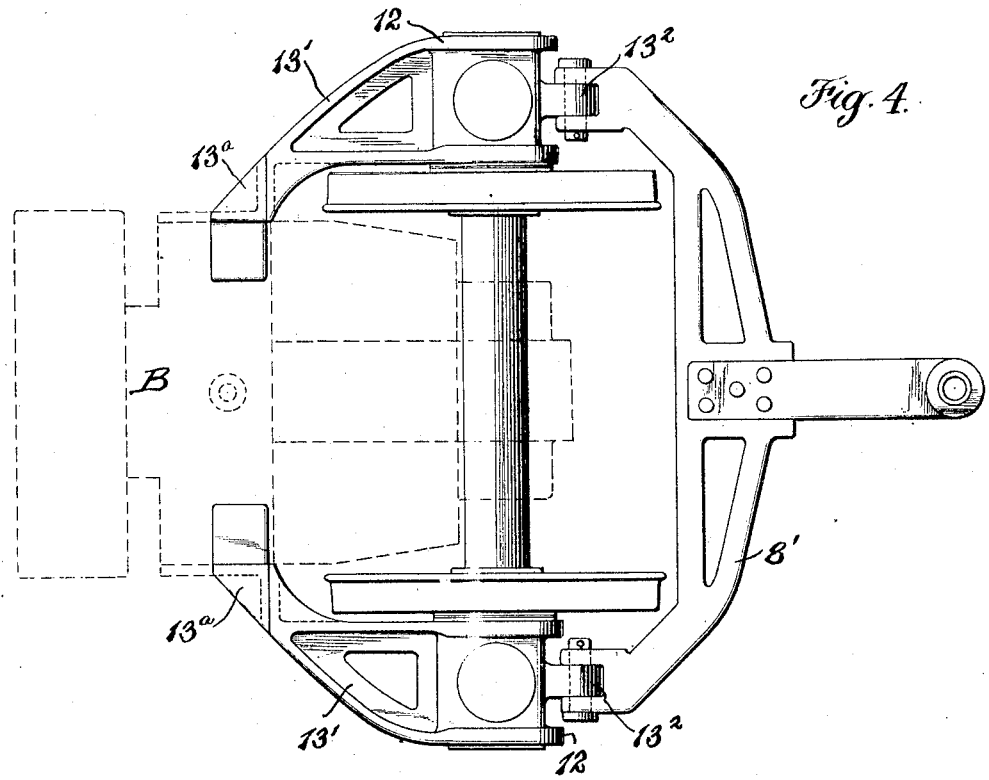
Fig. 4 is a plan view corresponding to Fig. 1 but illustrating a modification of our invention.
Figure 5:
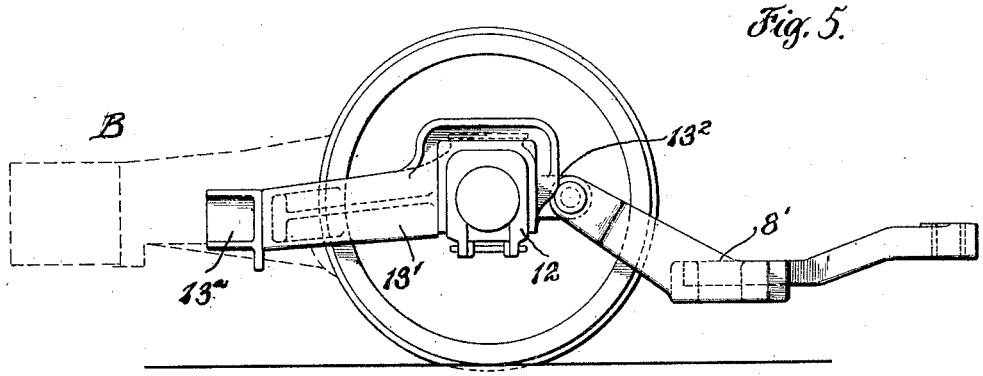
Fig. 5 is a side elevation of the construction of Fig. 4.

Referring now to the construction of Figs. 4 and 5, it will be seen that the same open type of truck is illustrated. In this instance, however, the supporting brackets 13' and the saddles 12 are made integral and the saddles are provided at their forward ends with projecting apertured lugs $13^2$ by means of which the radius bar 8' may be articulated with the saddles and the brackets. The brackets 13' have separable pieces 13ª for supporting the booster motor. In order to use this constructon as a simple truck, the radius bar 8' is removed, the booster and the members 13ª are omitted and a suitable radius bar secured to the brackets 13'. As before, the booster may be supported by a single or double link suspension.

Figure 6:
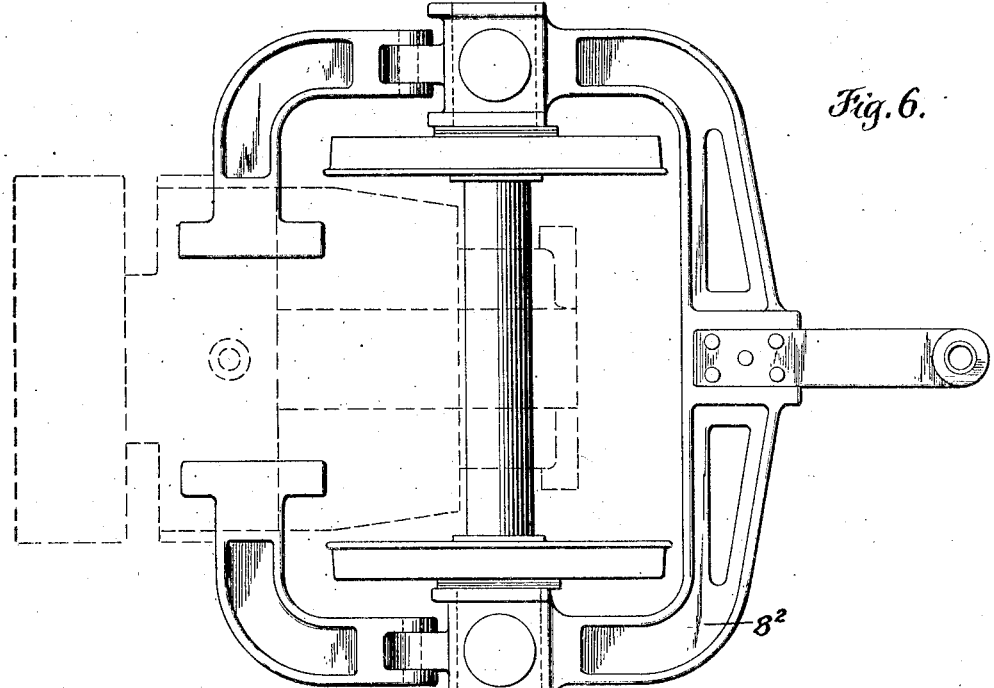
Fig. 6 is a plan view of still another modification of our invention.

In Fig. 6 we have illustrated a construction which is quite similar to that shown in Fig. 1 with the exception that a different form of radius bar 8² is employed.

Figure 7:
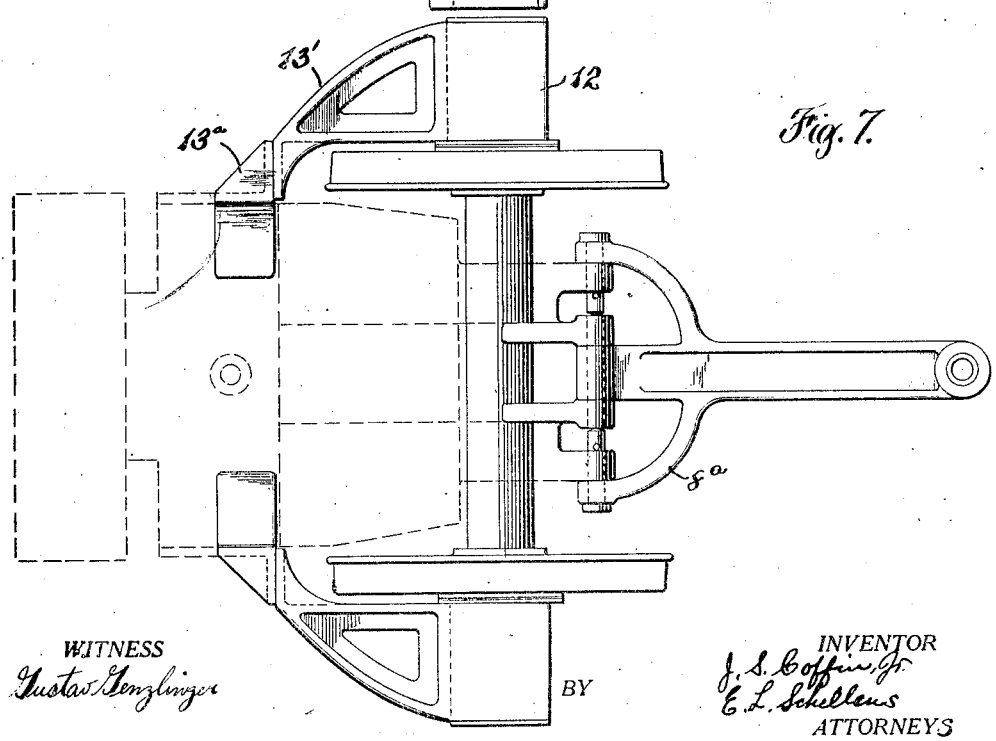
Fig. 7 is also a plan view of a different modification.

In the arrangement of Fig. 7, the same construction of saddle and supporting brackets as is shown in Figs. 4 and 5 is employed, but in this instance the radius bar 8ª is articulated to the forward end of the booster motor casing or bed plate.

We make no claims herein specific to the self-aligning box, nor to the open type of truck, broadly.

What we claim is:

1. The combination with a booster motor for locomotives, of a truck having boxes, an axle and wheels, and means articulated with the truck body adjacent said boxes for maintaining the booster motor in alignment with the axle.

2. The combination with a booster motor for locomotives, of a truck having an axle and wheels, and means pivoted to the truck body for movement about a horizontal axis transverse the truck and adapted to support the booster motor in alignment with the axle.

3. In a locomotive, the combination of a truck including a frame having boxes and an axle and wheels, a booster motor for driving the same, and means on the truck body engaging the booster motor and supporting the same in alignment with the axle of the truck and forming, with the booster motor, a part of the truck frame.

4. The combination with a booster motor for locomotives, of a truck having an open frame and an axle carried in said frame provided with wheels, the booster being carried on said axle, and means articulated to the open frame for supporting the booster motor.

5. In a locomotive, the combination of a truck having an open frame with an axle and wheels, means pivotally connecting the frame with the locomotive, a booster motor carried on the axle, and means articulated to the frame and extending rearwardly therefrom for supporting the booster in alignment with the axle.

6. In a locomotive, the combination of a truck having an open frame with an axle and wheels, means pivotally connecting the frame with the locomotive, a booster motor carried on the axle, and means articulated to the frame and extending rearwardly therefrom for supporting the booster in alignment with the axle, said means comprising a pair of brackets adapted to be attached to the booster motor.

7. In a locomotive, the combination of a truck and a booster motor, the truck having a frame portion and a booster supporting portion adapted to maintain alignment of the booster and the truck axle, one of said portions having boxes and one also being articulated to the other, and an axle having wheels journaled in the boxes.

8. In a locomotive, the combination of a truck and a booster motor, the truck having a frame portion and a booster supporting portion adapted to maintain alignment of the booster and the truck axle, one of said portions having box saddles integral therewith and one also being articulated to the other, and an axle having wheels journaled in the boxes.

9. The combination with a locomotive, of a booster device including means whereby the device may be pivoted to the locomotive, an axle having wheels, a booster motor carried on the axle, and means whereby the booster motor is maintained in alignment with the axle, said means being pivoted to swing on an axis adjacent said axle.

10. In a locomotive, a truck having an open frame, an axle with wheels, boxes in the frame in which the axle is journaled, said boxes having means compensating for springing of the frame, a booster motor, and means articulated with the frame for maintaining the boster in alignment with the axle.

11. In a locomotive, a truck having an open frame, an axle with wheels, self-aligning boxes in the frame in which the axle is journaled, a booster motor, and means articulated with the frame for maintaining the booster in alignment with the axle.

12. The combination with a locomotive; of an open truck having an axle, means for pivotal attachment to the locomotive, means for maintaining a booster motor in alignment with the axle, and a booster motor means, one of said means being articulated with another; and means for suspending the booster motor means from the locomotive.

13. The combination with a locomotive; of an open truck having an axle, means for pivotal attachment to the locomotive, means for maintaining a booster motor in alignment with the axle, and a booster motor means, one of said means being articulated with another; and one also having journals for the axle; and means for suspending the booster motor means from the locomotive.

14. The combination with a locomotive; of an open truck having an axle, means for pivotal attachment to the locomotive, means for maintaining a booster motor in alignment with the axle, and a booster motor means, one of said means being articulated with another; and a link suspension for suspending the booster motor from the locomotive.

15. The combination with a booster motor for locomotives, of a truck having an open frame and an axle carried in said frame provided with wheels, the booster being carried on said axle, and means articulated to the open frame to one side of the axle for supporting the booster motor, the joint being such as to permit the booster to rock on the axle without binding.

16. The combination with a booster motor for locomotives, of a truck having an open frame and an axle carried in said frame provided with wheels, the booster being carried on said axle, and means articulated to the open frame to one side of the axle for supporting the booster motor, the joint being such as to prevent transmission of vibration to the said supporting means.

17. The combination with a booster motor for a railway vehicle, of a truck having a frame with an axle and wheels, the booster being at least partially supported on said axle, and booster supporting means pivoted on said truck adjacent said axle, the pivot joint including an elongated opening to allow said supporting means a rocking movement at the pivot.

In testimony whereof, we have hereunto signed our names.

E. L. SCHELLENS.
J. S. COFFIN, Jr.